June 30, 1942.     R. T. WETTELAND     2,288,505
MANOMETER
Filed May 21, 1941     2 Sheets-Sheet 1
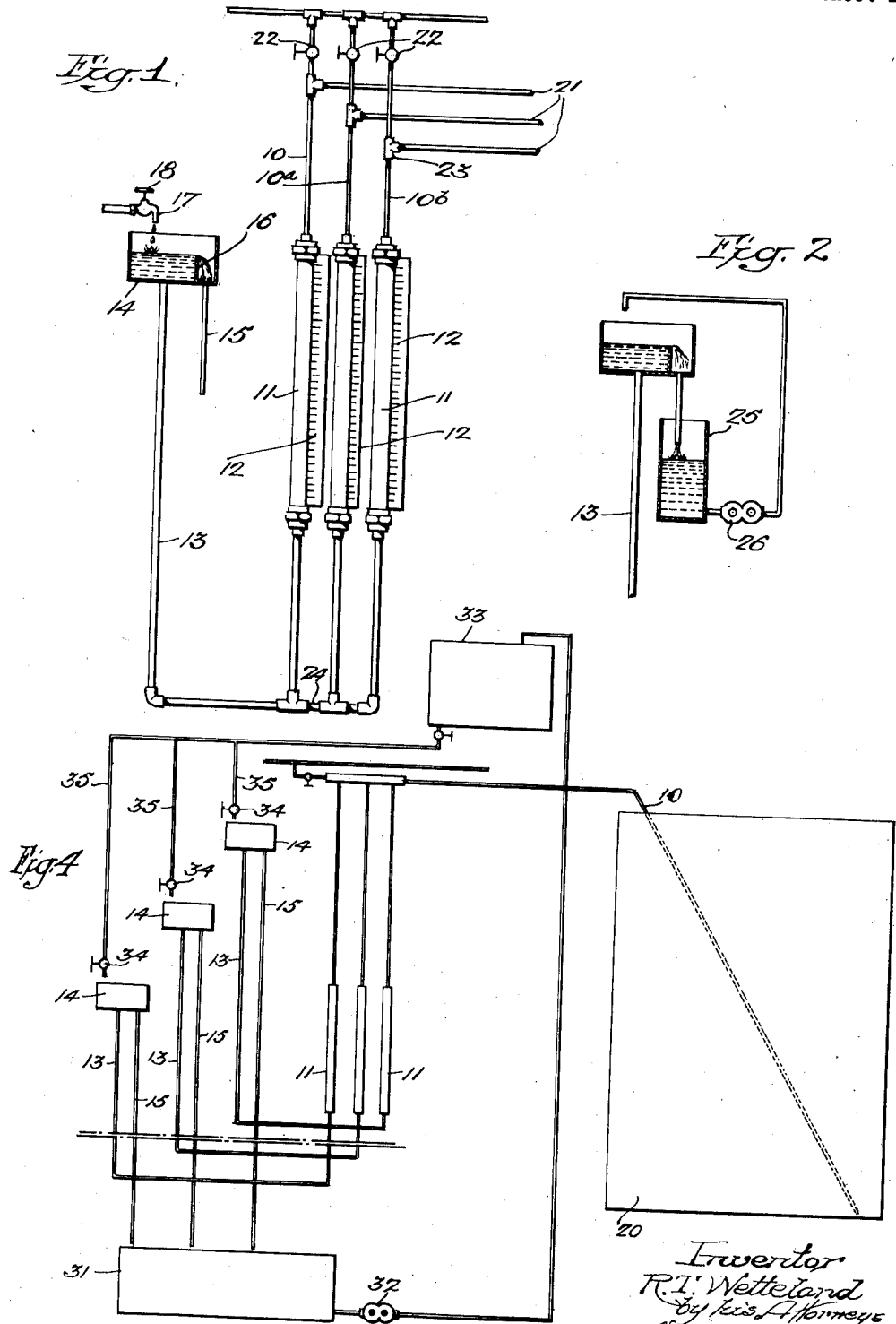

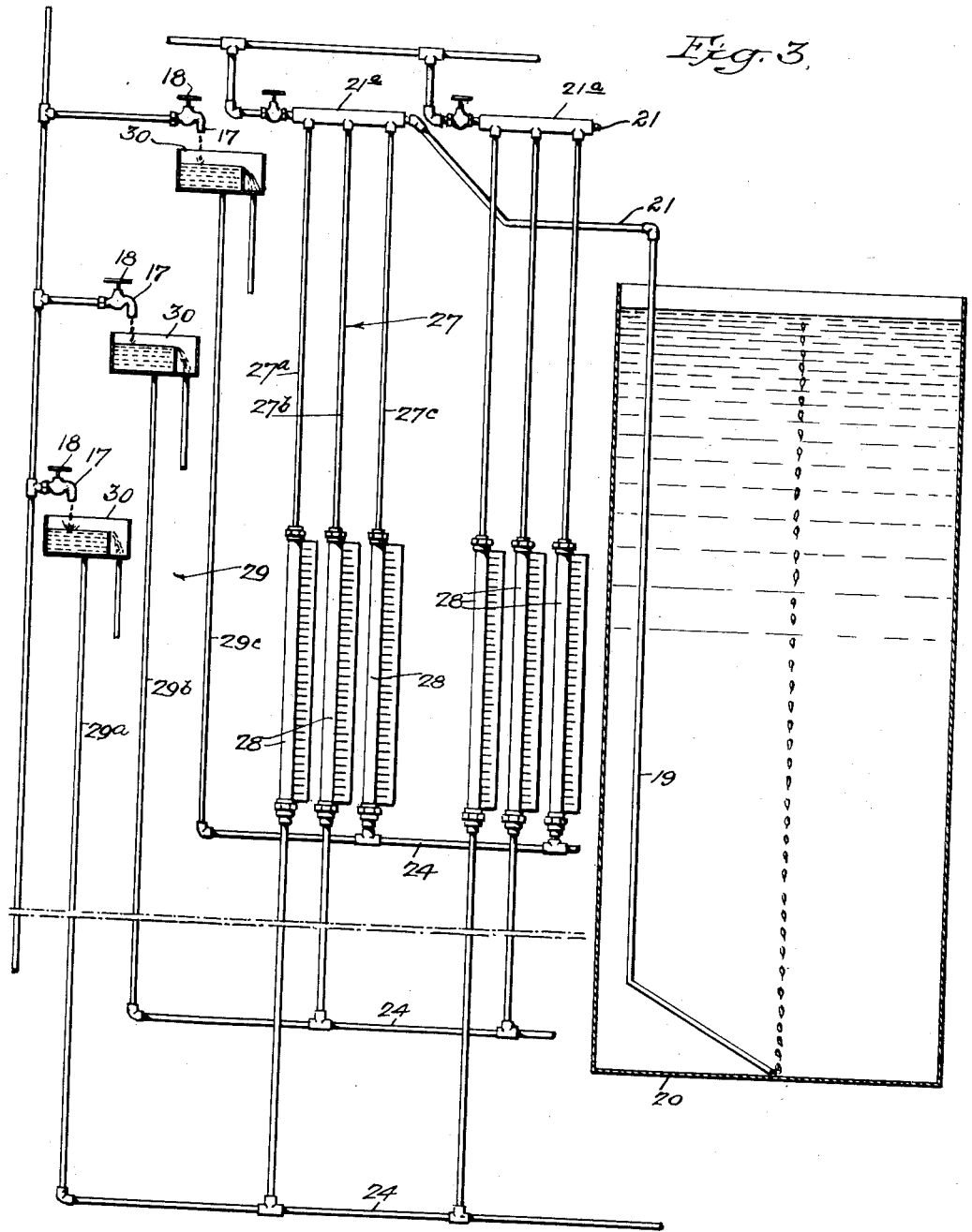

Patented June 30, 1942

2,288,505

UNITED STATES PATENT OFFICE 2,288,505

MANOMETER

Rolf T. Wetteland, Elkins Park, Pa.

Application May 21, 1941, Serial No. 394,535

4 Claims. (Cl. 73—31)

This invention relates to manometers and, more particularly, to gauges intended for accurate measurement of low gas pressures such, for example, as those derived by the use of a conventional bubble tube employed in tank gauges.

An important object of the invention is the provision of means whereby the accuracy of the gauge may be insured through the maintenance of a constantly corrected zero level therein.

Another object of the invention is the provision of a U-tube type gauge of such construction that changes in liquid level in the gauge occur only in one leg thereof, thereby multiplying the liquid movement in the other or gauging leg of the tube and, accordingly, permitting the use of more widely spread and accurately readable graduations.

Another object of the invention is the provision in a gauge of this type of an arrangement such that a plurality of such gauges may employ a common constant level leg.

A still further object of the invention is the provision of a construction such that the reading portion of the gauge may be reduced to relatively short dimensions while employing a relatively light liquid in the gauge.

Another object of the invention is the provision of a gauge of this type which may be very readily and cheaply manufactured and installed.

These and other objects I attain by the construction shown in the accompanying drawings wherein, for the purpose of illustration, I have shown preferred embodiment of my invention and wherein:

Fig. 1 is a semi-diagrammatic view showing a simple form of manometer constructed in accordance with my invention;

Fig. 2 is a diagrammatic view showing a method of conserving the gauging fluid in a structure of the type shown in Figure 1;

Fig. 3 is a diagrammatic illustration of a modified form of my invention enabling convenient gauging with light fluids of relatively high gaseous pressures; and Fig. 4 is a diagrammatic view showing addition to the structure of Fig. 3 of an apparatus for conserving the gauging fluid.

Referring now to the drawings and, more particularly, to Figure 1 thereof wherein I have shown a simple gauge constructed in accordance with my invention, the numeral 10 generally designates what may be termed the reading leg of the gauge, this leg including a sight glass 11 having suitable graduations 12 associated therewith. The second leg of the gauge, indicated at 13, terminates at its upper end in a chamber 14 including an outlet 15 separated from the remainder of the chamber through an overflow dam 16. A constant, slow supply of gauging liquid is fed into the body of the chamber and excess liquid dribbles over the dam 16 and passes through the outlet 15. The supply may comprise a small nozzle 17 the flow through which is controlled by a valve 18 preferably of the needle type.

It will be obvious that a constant pressure or head is maintained in the reading leg 10, since the level in the leg 13 is regulated by dam 16. Any fluid discharged from the reading leg through pressure placed thereon will be transferred through the leg 13 to the chamber 14 and escape over the dam. The pressure exerted on the reading leg may be derived from a bubble tube 19 in a tank 20 (Figs. 3 and 4) the contents of which are to be gauged. Air is supplied to this bubble tube through a conduit 21 fed through a needle valve 22 and a tap 23 is led from the conduit 21 to the upper end of the reading tube 10.

A single leg 13 may be made to serve a plurality of reading legs 10, 10a, 10b by simply making the connection between these reading legs in the form of a manifold 24 to which the lower ends of all of the legs are connected, each of the legs 10, 10a, 10b having an independent bubble tube and air pressure supply system associated therewith. Such an arrangement is highly convenient due to the fact that the gauges of scattered tanks may all be located at a common point for reading. Where the liquid employed in the gauge is water, the waste from the chamber 14 may be simply drained away. Where it is desired to use a more expensive liquid, or where the water supply is limited, the liquid overflow may be collected in a sump 25 and returned to the chamber 14 through a slowly operating pump 26, as shown in Figure 2.

It will be obvious that where considerable gas pressures are to be measured as, for example, when the tanks being gauged are of considerable depth, the necessary length of the reading leg will be such that it will be extremely inconvenient to read the same. In the construction illustrated in Figures 3 and 4, I have illustrated a method of eliminating an elongated reading tube by the process of subdividing the same into a plurality of sections which become consecutively readable. This I accomplish by dividing both the reading and fixed pressure legs of the gauge into a plurality of sections.

In the form at present illustrated, the reading leg 27 comprises sections 27a, 27b, 27c, each consisting of a length, or lengths, of tubing having interposed therein a short reading section 28, these reading sections being of the same length and arranged in side-to-side relation. The constant level leg 29 simply comprises three sections 29a, 29b, 29c, each having an independent constant level chamber 30. These constant level chambers are arranged at different elevations, the difference in elevation being preferably the same as, or slightly less than, the length of the reading sections 28 of the elements of the reading leg 27. Each fixed level leg element 29a, 29b, 29c, has its lower end connected to the lower end of the corresponding reading leg element 27a, 27b, 27c. The lowermost liquid level chamber 30 is so disposed that the upper end of the liquid column at zero pressure in the corresponding reading leg will appear at the upper end of the sight glass. The next higher chamber 30 is so arranged that as the liquid disappears from the sight glass of the preceding leg the upper level thereof appears in such second glass, and so on. While a three-section reading leg has been illustrated in the present instance, the number of sections may, obviously, be multiplied to any desired extent and thus enable reading of considerable pressure by the use of a much foreshortened gauging element. Obviously, in a device of this type the gas pressure to be measured is simultaneously communicated to the upper ends of all of the elements of the reading legs, as for example, by means of headers, 21a in conduits 21. As in the case of the construction hereinbefore discussed, it is possible to use a single set of fixed leg elements for gauging pressures from different sources by constructing the connection between the fixed leg elements and their corresponding reading leg elements as manifolds.

In a construction of the type just described where it is desired to conserve the gauging fluid, all of the overflows of the fixed level compartments may be made to discharge to a common sump 31 and be returned to the chambers through a pump 32 by way of a reservoir 33. In such an arrangement the use of valves 34 in the distribution branches 35 from the pump is essential to obtain proper distribution of the liquid.

Since the constructions herein described and illustrated are merely examples of many possible variations of my invention, I do not wish to be understood as limiting myself thereto except as hereinafter claimed.

I claim:

1. In a manometer, a U-tube one leg of which comprises a series of tubes each including a transparent reading section, said reading sections being disposed in side-to-side relation, the portions of each tube beneath the reading section thereof extending below such reading section through a distance equal to the combined lengths of the reading sections of the succeeding tubes of the series the other leg comprising a tube for each of the first-named tubes, the lower ends of corresponding tubes of said legs being connected, means to maintain a fixed liquid level in each of the last-named tubes, the fixed liquid levels of the last-named tubes differing in each tube, and a common source of pressure connected to the upper ends of the first-named tubes.

2. In a manometer, a U-tube one leg of which comprises a series of tubes each including a transparent reading section, said reading sections being disposed in side-to-side relation, the portions of each tube beneath the reading section thereof extending below such reading section through a distance equal to the combined lengths of the reading sections of the succeeding tubes of the series the other leg comprising a tube for each of the first-named tubes, the lower ends of corresponding tubes of said legs being connected, means to maintain a fixed liquid level in each of the last-named tubes, the fixed liquid levels of the last-named tubes differing in each tube by a distance approximating the height of the transparent reading sections of the first-named tubes, and a common source of pressure connected to the upper ends of the first-named tubes.

3. In a manometer, a U-tube one leg of which comprises a series of tubes each including a transparent reading section, said reading sections being disposed in side-to-side relation, the portions of each tube beneath the reading section thereof extending below such reading section through a distance equal to the combined lengths of the reading sections of the succeeding tubes of the series the other leg comprising a tube for each of the first-named tubes, the lower ends of corresponding tubes of said legs being connected, means to maintain a fixed liquid level in each of the last-named tubes, said means comprising a chamber at the upper end of each of the last-named tubes and with which the tube communicates, an overflow dam forming an outlet for said chamber, and means to continuously deliver liquid to that portion of the chamber with which the tube communicates, the fixed liquid levels of the last-named tubes differing in each tube, and a common source of pressure connected to the upper ends of the first-named tubes.

4. In a manometer, a U-tube one leg of which comprises a series of tubes each including a transparent reading section, said reading sections being disposed in side-to-side relation, the portions of each tube beneath the reading section thereof extending below such reading section through a distance equal to the combined lengths of the reading sections of the succeeding tubes of the series the other leg comprising a tube for each of the first-named tubes, the lower ends of corresponding tubes of said legs being connected, means to maintain a fixed liquid level in each of the last-named tubes, said means comprising a chamber at the upper end of each of the last-named tubes and with which the tube communicates, an overflow dam forming an outlet for said chamber, and means to continuously deliver liquid to that portion of the chamber with which the tube communicates, the fixed liquid levels of the last-named tubes differing in each tube, a common source of pressure connected to the upper ends of the first-named tubes, and means to return the fluid passing over said dams to said chambers.

ROLF T. WETTELAND.